(12) United States Patent  
Stodgel

(10) Patent No.: US 9,409,325 B2  
(45) Date of Patent: Aug. 9, 2016

(54) MOLDING SYSTEM AND METHOD HAVING DUAL SPLIT RING PLUNGER

(71) Applicant: Caterpillar Inc., Peoria, IL (US)

(72) Inventor: Andrew R. Stodgel, Boonville, MO (US)

(73) Assignee: Caterpillar Inc., Peoria, IL (US)

( * ) Notice: Subject to any disclaimer, the term of this patent is extended or adjusted under 35 U.S.C. 154(b) by 4 days.

(21) Appl. No.: 14/508,478

(22) Filed: Oct. 7, 2014

(65) Prior Publication Data

US 2016/0096295 A1 Apr. 7, 2016

(51) Int. Cl.
*B29C 45/36* (2006.01)
*B29C 43/36* (2006.01)
*B29C 45/58* (2006.01)
*B29C 45/02* (2006.01)

(52) U.S. Cl.
CPC ............. *B29C 43/361* (2013.01); *B29C 45/586* (2013.01); *B29C 45/02* (2013.01)

(58) Field of Classification Search
CPC .... B29C 45/02; B29C 45/021; B29C 45/022; B29C 45/025; B29C 45/586; B29C 43/361; B29C 2045/024
USPC ........................................................ 425/544
See application file for complete search history.

(56) References Cited

U.S. PATENT DOCUMENTS

| | | |
|---|---|---|
| 2,482,338 A | 9/1949 | Hall |
| 3,405,214 A | 10/1968 | Butts |
| 3,647,337 A | 3/1972 | Dega |
| 4,723,899 A | 2/1988 | Osada |

FOREIGN PATENT DOCUMENTS

| | | |
|---|---|---|
| JP | 62-039214 A | 2/1987 |
| JP | 4240258 B2 | 3/2009 |

*Primary Examiner* — Alison L Hindenlang
*Assistant Examiner* — Mohamed K Ahmed Ali
(74) *Attorney, Agent, or Firm* — Baker & Hostetler LLP

(57) ABSTRACT

A plunger is provided. The plunger includes a top plate and a bottom plate coupled to the top plate. A first split ring is provided between the top plate and the bottom plate and is coupled to the top plate. A second split ring is provided between the first split ring and the bottom plate and is coupled to the first split ring.

19 Claims, 12 Drawing Sheets

MOLDING SYSTEM AND METHOD HAVING DUAL SPLIT RING PLUNGER

TECHNICAL FIELD

This patent disclosure relates generally to molding systems and methods, and more particularly, to a molding system and method including a dual split ring plunger.

BACKGROUND

Conventionally, during a molding process, a molding material is placed into a pot and a plunger pushes the molding material through sprues and into a mold cavity. A clearance or a gap between an edge of the plunger and an inside edge or an inner wall of the pot has to be as close as possible without having the edge of the plunger touch a side wall of the pot. The number of sprues and the cross section of the sprues (or, a calculated area of all the sprues) will determine the dimensions of the minimum gap between the pot to the plunger. If the gap has a larger cross section than the calculated sprue area, then the molding material will take the path of least resistance and push up between the pot and plunger instead of flowing into the part cavity. This will create a scrap part. If the gap has a smaller cross section than the calculated sprue area, an operator of the mold press will have to pry the mold plates apart creating a potential unsafe work condition. One such conventional molding apparatus is disclosed in the U.S. Pat. No. 3,405,214 to Butts.

Accordingly, there is a need to resolve these and other problems related to the conventional molding systems.

SUMMARY

In one aspect, a plunger is provided. The plunger includes a top plat and a bottom plate coupled to the top plate. A first split ring is provided between the top plate and the bottom plate and is coupled to the top plate. A second split ring is provided between the first split ring and the bottom plate and is coupled to the first split ring.

In another aspect, a molding system is provided. The molding system includes a pot configured to hold a molding material. The molding system includes a plunger configured to move along an inner wall of the pot to push the molding material into a mold cavity through a plurality of sprues at a base of the pot. The plunger includes a top plate and a bottom plate coupled to the top plate by a pair of spring members. A first split ring is provided between the top plate and the bottom plate and is coupled to the top plate. A second split ring is provided between the first split ring and the bottom plate and is coupled to the first split ring In yet another aspect, a method of making a plunger is provided. The method includes providing a top plate and providing a bottom plate coupled to the top plate by a spring member. The method includes providing a first split ring between the top plate and the bottom plate and coupled to the top plate. The method includes providing a second split ring between the first split ring and the bottom plate and coupled to the first split ring.

DETAILED DESCRIPTION

Figure 1:
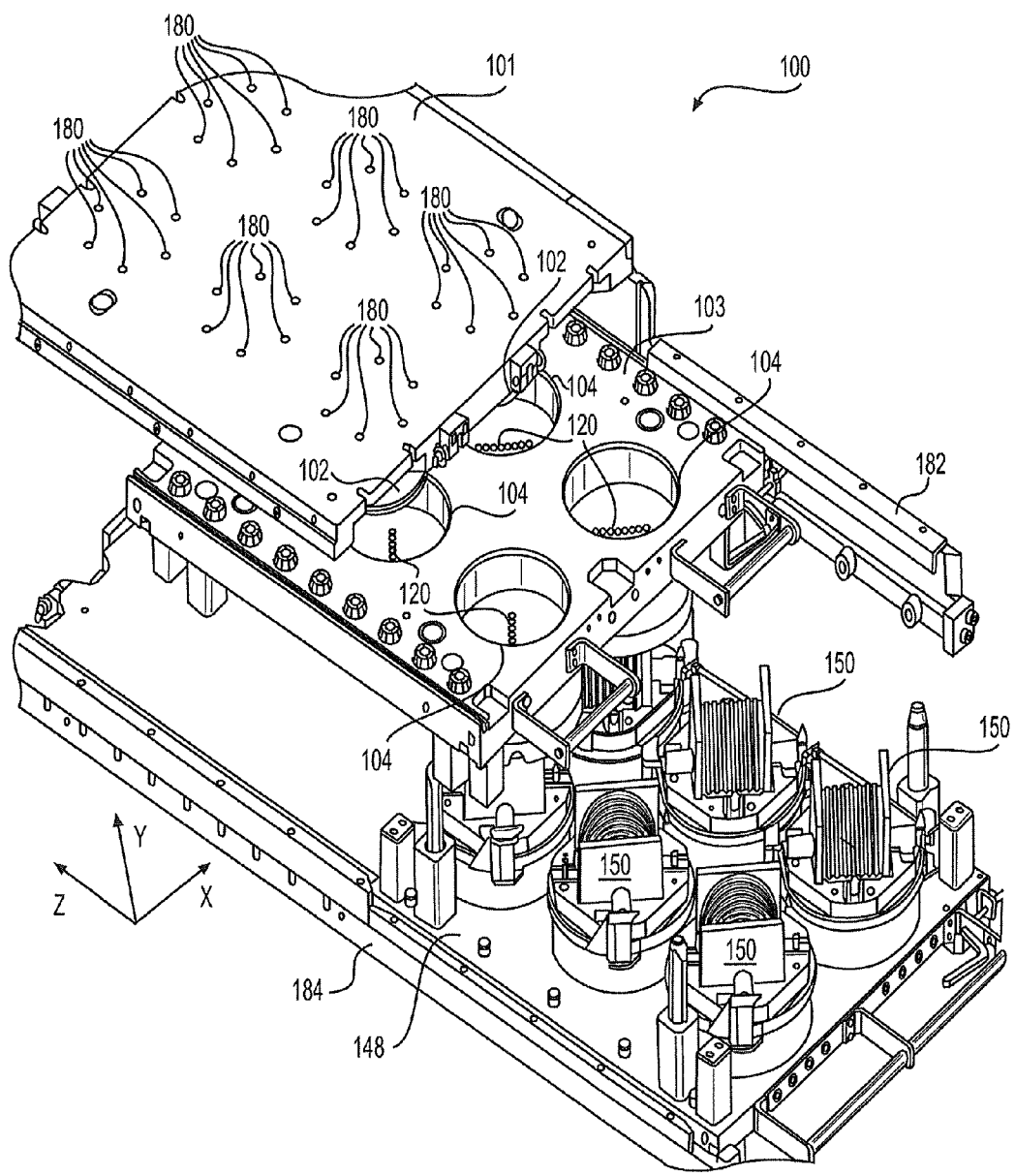
FIG. 1 illustrates a molding system, in accordance with an aspect of this disclosure.

Now referring to the drawings, wherein like reference numbers refer to like elements, there is illustrated in FIG. 1 an isometric view of a molding system 100, in accordance with an aspect of this disclosure. The molding system 100 may include a plunger plate 101, a pot plate 103, and a mold plate 148, in a top to bottom arrangement going along a negative Y-axis in the Cartesian coordinates illustrated in FIG. 1. The plunger plate 101 is configured to slide over the pot plate 103 via rails 182 (with only one of the two rails 182 being illustrated in FIG. 1 for clarity). The mold plate 148 is arranged to slide over rails 184 to align under the pot plate 103 (with only one of the two rails 184 being illustrated in FIG. 1). Though not explicitly shown, the molding system 100 may include additional components including, but not limited to, power supplies, control systems, guide pillars for the plunger plate 101, the pot plate 103, and the mold plate 148, a pressing mechanism to press the plunger plate 101 against the pot plate 103 and the mold plate 148, a base to stably hold the molding system 100, screws and bolting mechanisms to hold various parts of the molding system 100 together, and combinations thereof. In one aspect, the molding system 100 may be a transfer molding system. In another aspect, the molding system 100 may be a compression molding system, although the molding system 100 may implement other types of molding systems and processes.

The plunger plate 101 may include a plurality of plungers 102, attached to an under surface of the plunger plate 101 via screws 180, although other types of attachment mechanisms (e.g., springs, magnets, etc.) could be used. The plurality of plungers 102 are discussed with respect to FIGS. 2-12, using only one of the plurality of plungers 102 as an example.

The pot plate 103 may include a plurality of pots 104, to spatially correspond or match with the plurality of plungers 102. The plurality of pots 104 may be shaped to hold various types of molding materials, including but not limited to, rubber, resins, or other types of polymers. Each of the plurality of pots 104 includes a plurality of sprues 120 at a base 216 (shown in FIG. 2). An orientation or arrangement of the plurality of sprues 120 may be varied according to various aspects of this disclosure and the arrangement shown herein is by way of example only and not by way of limitation.

The mold plate 148 includes a plurality of mold mounts 150. Various types of molds may be attached to each of the plurality of mold mounts 150 based upon an article to be manufactured by the molding system 100. Upon application of heat followed by a cooling period, the article to be manufactured may take positive or negative shape of the molds attached to the plurality of mold mounts 150, as may be understood by one of ordinary skill in the art in view of this disclosure.

Figure 2:
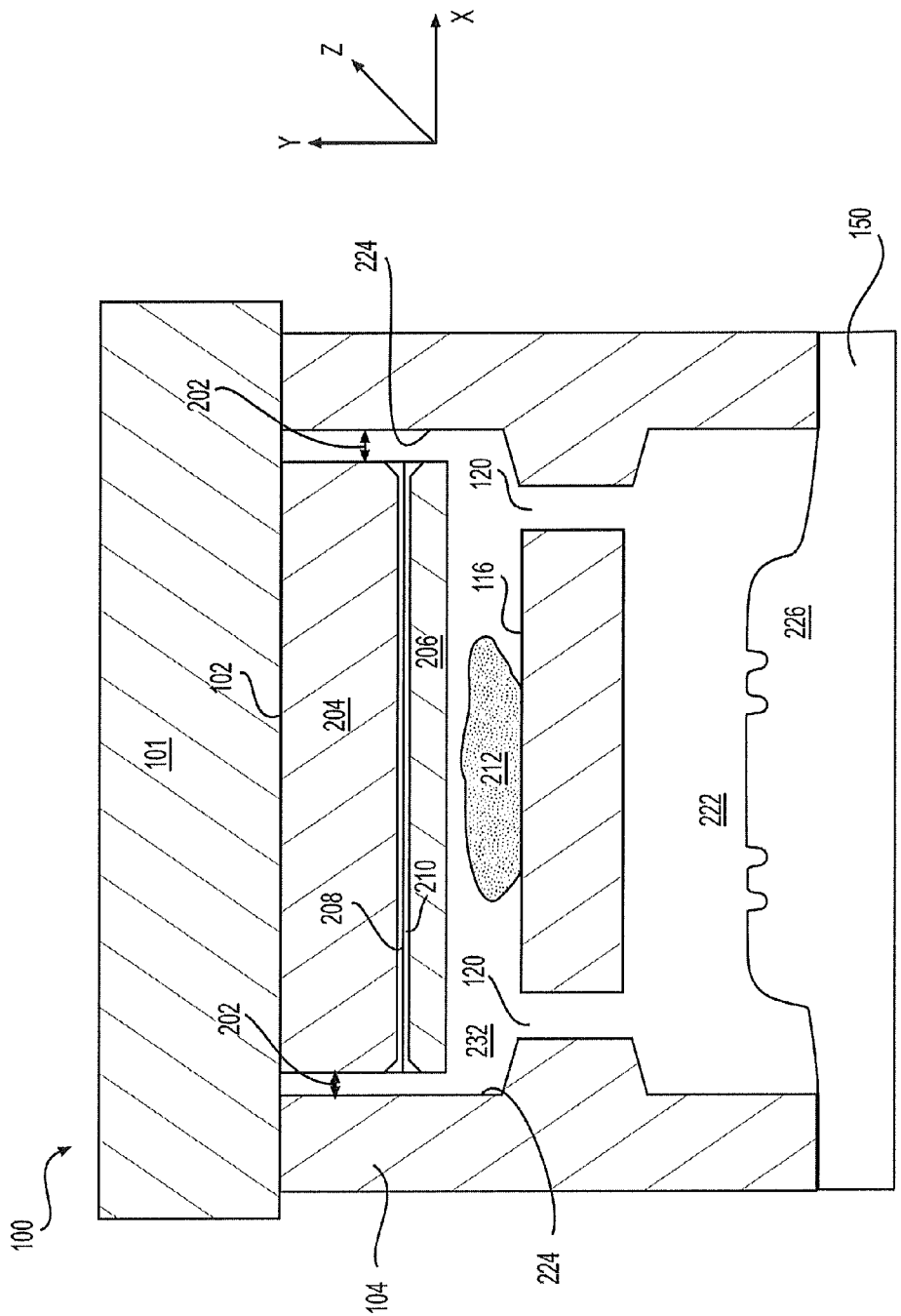
FIG. 2 illustrates a sectional view of a plunger and a pot, in accordance with an aspect of this disclosure.

Referring to FIG. 2, a sectional view of the molding system 100 for the plunger 102 and the pot 104 along the X-Y plane is illustrated, in accordance with an aspect of this disclosure. The plunger 102 is illustrated as attached to an undersurface of the plunger plate 101. It is to be noted that though only one of the plurality of plungers 102 and only one of the plurality of pots 104 are being discussed, the discussion herein equally applies to the remaining ones of the plurality of pots 104 and the plurality of plungers 102. The plunger 102 is illustrated inside the pot 104 and moves along the negative Y-axis to contact a molding material 212 placed or poured on the base 216 of the pot 104 in a volume 232 of the pot 104. A gap 202 exists between the plunger 102 and an inner wall 224 of the pot 104. Alternatively, in one aspect of the disclosure, the plunger 102 or the plunger plate 101 does not move. Instead, the pot plate 103 below the plunger plate 101 moves from a force applied by a hydraulic ram (not shown) of the molding system 100. Due to the force from the hydraulic press, the pot plate 103 is configured to move up to the plunger 102 (or, the plunger plate 101) to create a pressure acting on the bottom plate 206. The pressure results from the molding material 212 pushing against the bottom plate 206.

Figure 6:
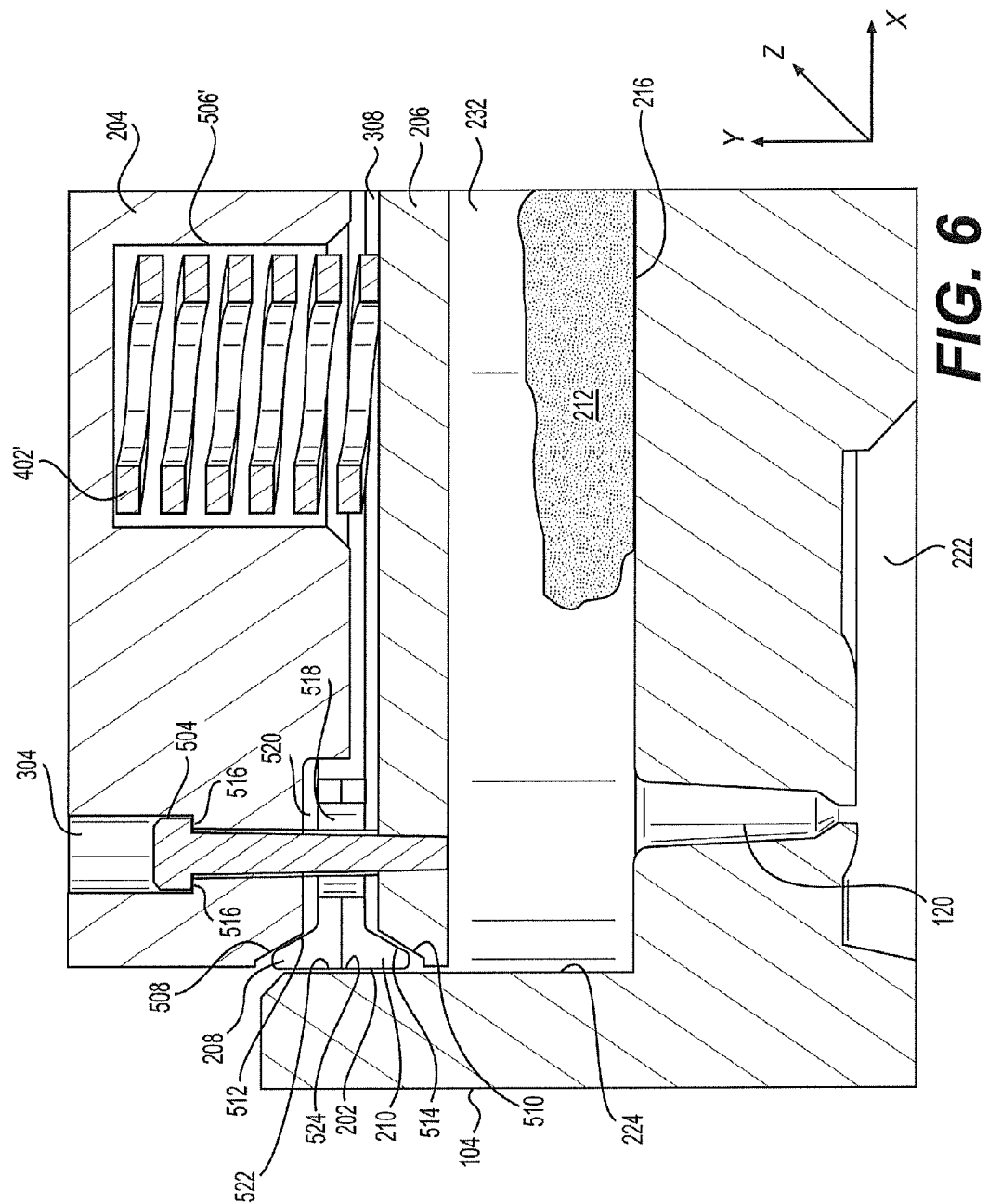
FIG. 6 illustrates a close-up cross-sectional view of the pot and the plunger in the first configuration, in accordance with an aspect of this disclosure.
Figure 8:
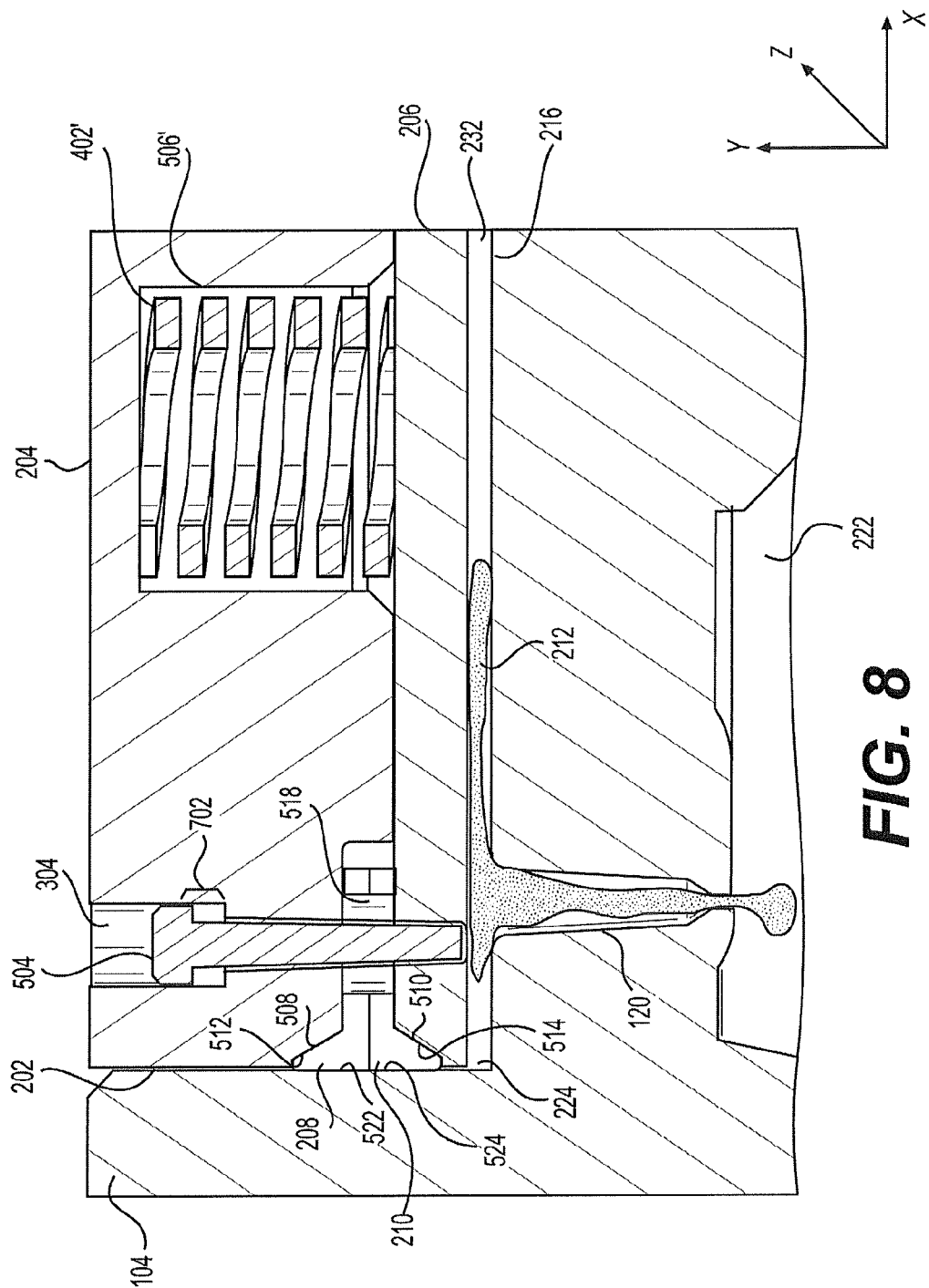
FIG. 8 illustrates a close-up cross-sectional view of the pot and the plunger in the second configuration, in accordance with an aspect of this disclosure.

According to an aspect of this disclosure, the plunger 102 includes a top plate 204, a bottom plate 206 and a dual split ring arrangement 1100 (shown in FIG. 11) formed by a first split ring 208 and a second split ring 210 between the top plate 204 and the bottom plate 206. The bottom plate 206 contacts and pushes the molding material 212 to pass through the plurality of sprues 120 into a mold cavity 222. Once inside the mold cavity 222, a temperature treatment may be applied to the molding material 212 to take a shape of a mold 226 mounted to the mold mount 150. It is to be noted that the plurality of sprues 120 may be arranged differently than the arrangement shown in FIG. 2. For example, the plurality of sprues 120 may be arranged such that in the sectional view shown in FIG. 2, only one of the plurality of sprues 120 is visible, with the remaining sprues being lined up behind the one of the plurality of sprues 120. Such a cross-sectional arrangement is shown in FIGS. 6 and 8, for example.

Figure 3:
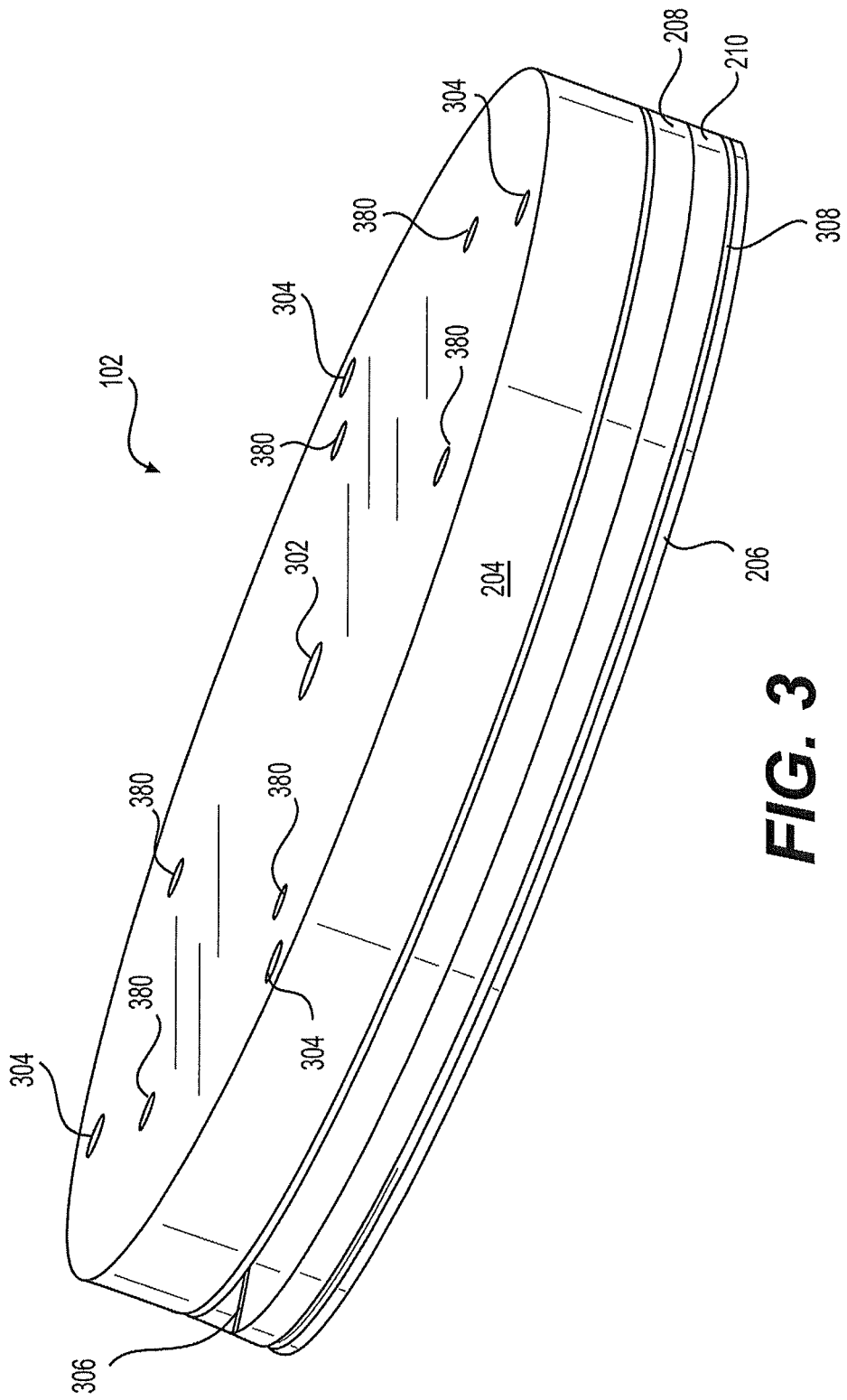
FIG. 3 illustrates an isometric view of a plunger, in accordance with an aspect of this disclosure.

FIG. 3 illustrates an isometric view of the plunger 102, in accordance with an aspect of this disclosure. The plunger 102 may include a central set screw hole 302 for a set screw 502 (discussed with respect to FIGS. 5 and 7) to hold the plunger 102 as a single piece during assembly. A surface of the plunger 102 may include receptacles 380 matching with the screws 180 that attach the plunger 102 to the plunger plate 101. In one aspect of this disclosure, the plunger 102 may include shoulder bolt cavities 304 to accommodate corresponding shoulder bolts 504 (discussed with respect to FIGS. 5-8) that keep the top plate 204 and the bottom plate 206 together. The first split ring 208 couples to the top plate 204 and is configured to include a first split 306. The second split ring 210 couples to the first split ring 208 and includes a second split 1002 (shown in FIGS. 10 and 11) that is oriented 180° apart diametrically from the first split 306. In one aspect of this disclosure, a spacing 308 may exist between the second split ring 210 and the bottom plate 206. By way of example only, the spacing 308 may vary between zero to a few millimeters.

Figure 4:
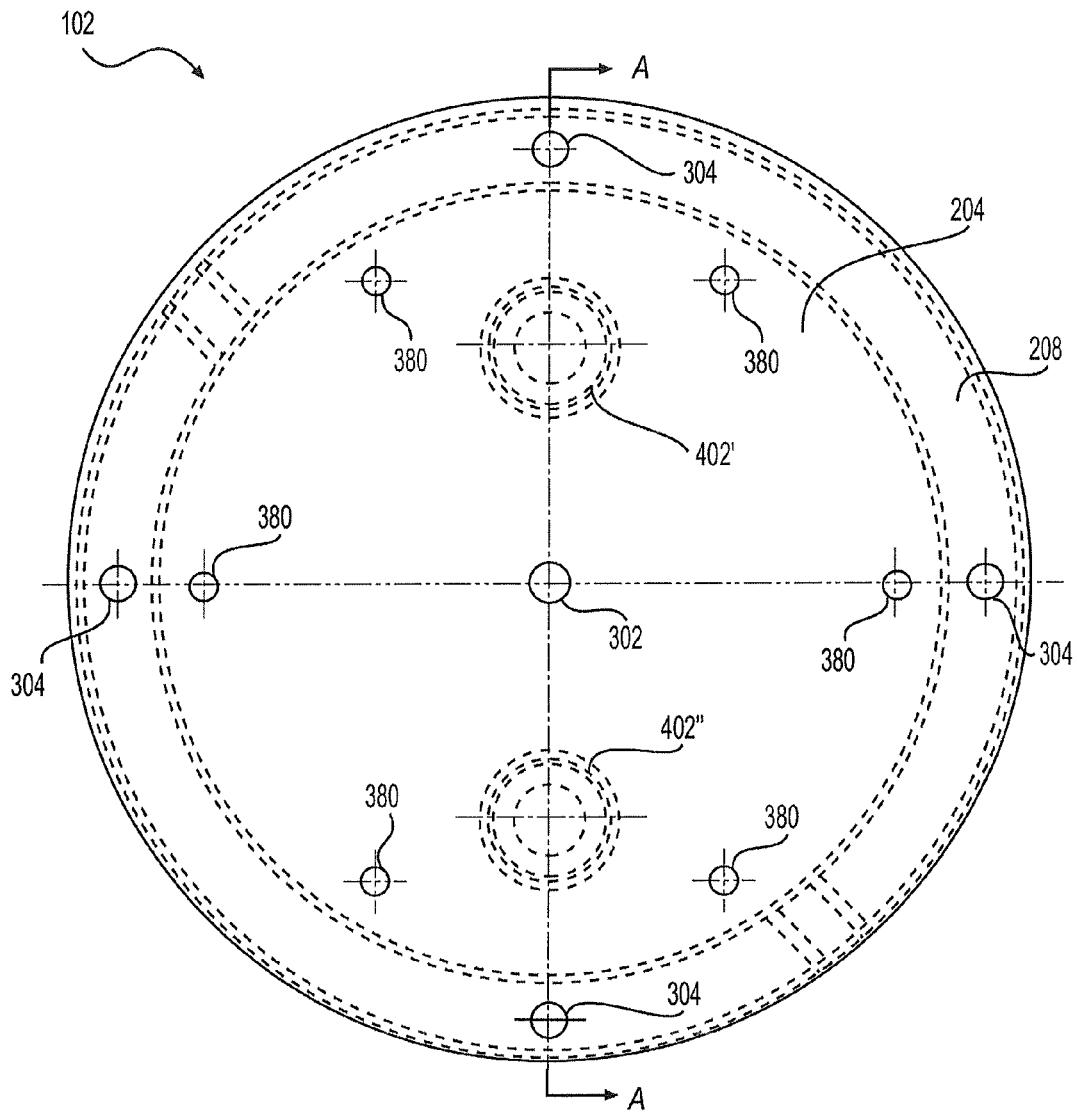
FIG. 4 illustrates a top view of the plunger, in accordance with an aspect of this disclosure.
Figure 7:
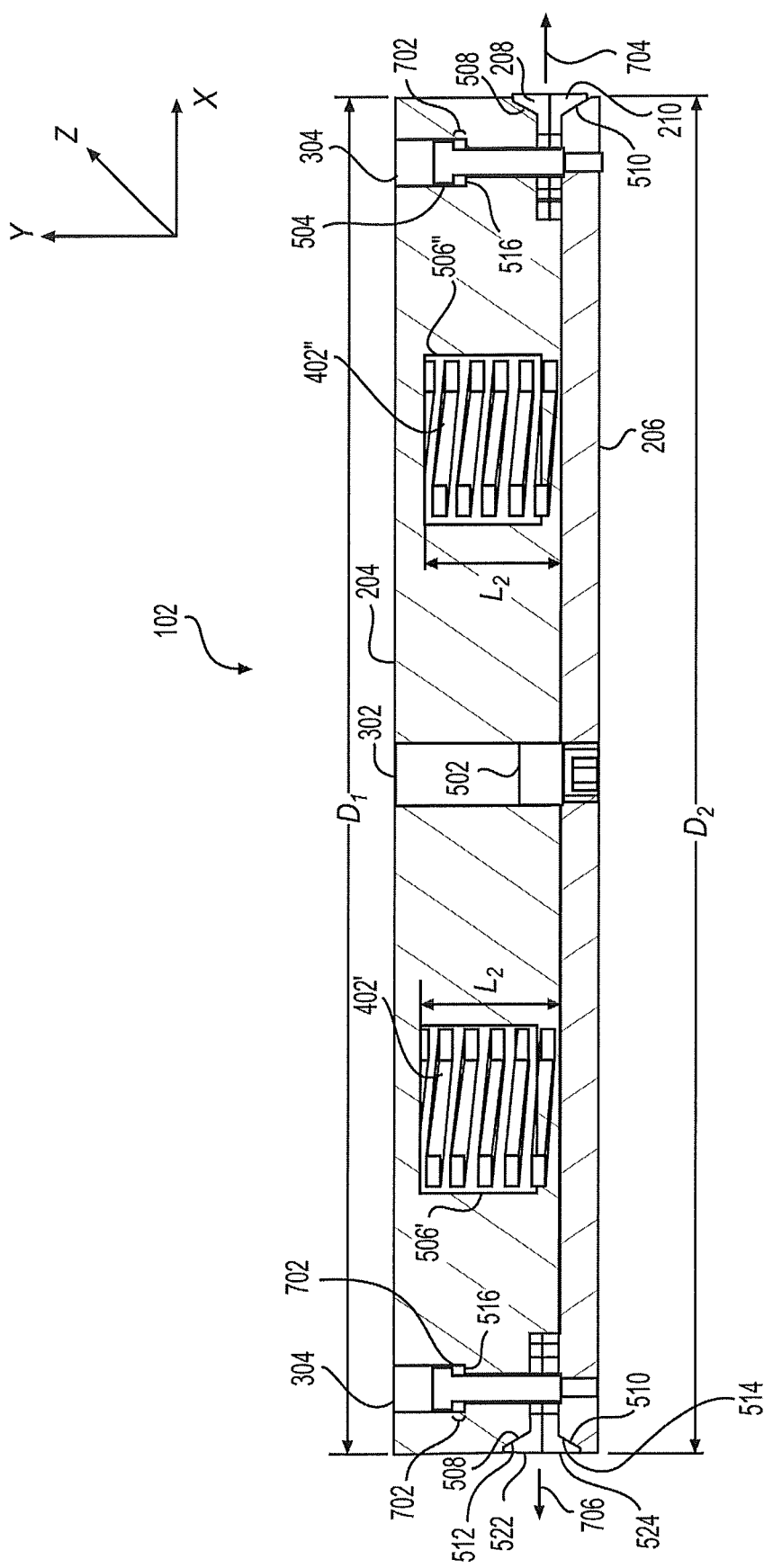
FIG. 7 illustrates a cross-sectional view of the plunger in a second configuration, in accordance with an aspect of this disclosure.

Referring to FIG. 4, a top view of the plunger 102 is illustrated, in accordance with an aspect of this disclosure. More particularly, the top plate 204 is shown with the central set screw hole 302, the shoulder bolt cavities 304, and the receptacles 380. Also illustrated in chained lines underneath a top surface of the top plate 204 is a pair of spring members 402' and 402" and the first split ring 208. It is to be noted that though only two of the pair of spring members 402' and 402" are illustrated, in other aspects of this disclosure, a higher plurality of spring members, or just a single spring member could be used. Internal details of the plunger 102 are discussed with respect to a section A-A taken along a diameter of the plunger 102, as illustrated in FIGS. 5 and 7.

Figure 5:
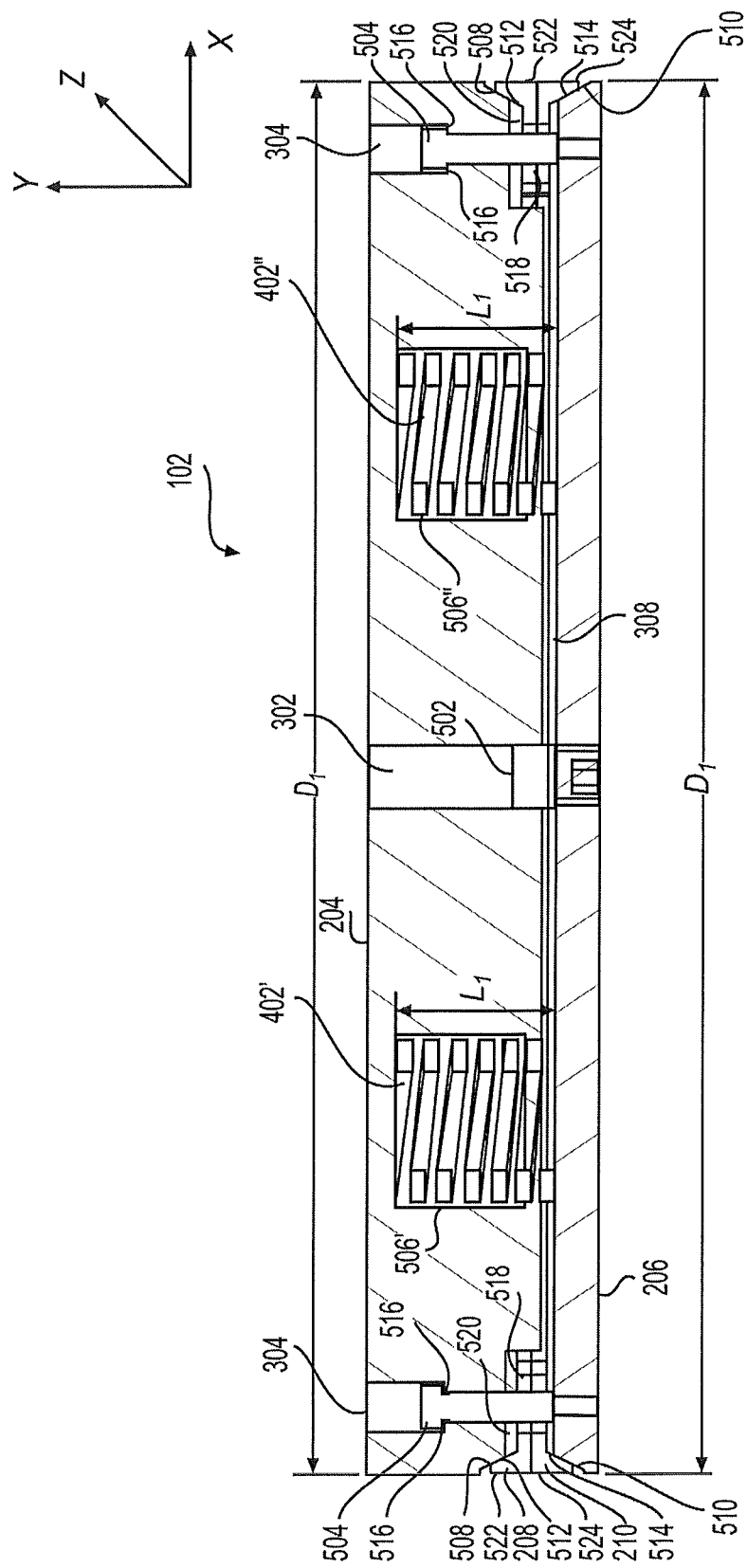
FIG. 5 illustrates a cross-sectional view of the plunger in a first configuration, in accordance with an aspect of this disclosure.

Referring to FIG. 5, a cross-section view of the plunger 102 along the section A-A in FIG. 4 is illustrated. FIG. 5 illustrates the set screw 502 in the central set screw hole 302 of the plunger 102, the pair of spring members 402' and 402", and the shoulder bolts 504 in the shoulder bolt cavities 304. The set screw 502 may be removed during assembly of the plunger 102 to allow insertion of the pair of spring members 402' and 402" into cutouts 506' and 506", respectively, of the top plate 204 of the plunger 102. Once inserted into the cutouts 506' and 506", each of the pair of spring members 402' and 402" is in an initial relaxed or extended state having a length $L_1$. The extended state of the pair of spring members 402' and 402" separates the top plate 204 and the bottom plate 206 resulting in the spacing 308 between the second split ring 210 and the bottom plate 206. During production of the plunger 102, once the pair of spring members 402' and 402" has been inserted into the respective cutouts 506' and 506", the set screw 502 may be installed. The top plate 204 and the bottom plate 206 are then coupled to each other via the pair of spring members 402' and 402".

It is to be noted that according to an aspect of the disclosure, instead of two of the pair of spring members 402' and 402", only one spring member 402' or 402" may be used. Alternatively, more than two of the pair of spring members 402' and 402" (e.g., three, four, etc.) could be used. In yet another aspect of this disclosure, instead of the pair of spring members 402' and 402", a pair of magnets could be used inside each of the cutouts 506' and 506" to initially separate the top plate 204 and the bottom plate 206 by the spacing 308. The pair of magnets may be permanent or may be electromagnets. A repulsive magnetic force between the pairs of magnets may be used to keep the top plate 204 and the bottom plate 206 separated initially. Such repulsive magnetic force between the pairs of magnets may then be overcome by the reaction force from the bottom plate 206 touching the molding material 212. In still another aspect of this disclosure, a combination of the pair of spring members 402' and 402" and corresponding pairs of magnets may be used to initially separate the top plate 204 from the bottom plate 206.

The top plate 204 includes a first tapered surface 508 and the bottom plate 206 includes a second tapered surface 510. The first tapered surface 508 is shaped to match with a first inner tapered surface 512 of the first split ring 208. Likewise, the second tapered surface 510 is shaped to match with a second inner tapered surface 514 of the second split ring 210.

In the initial extended state of the pair of spring members 402' and 402", the plunger 102 is said to be in a first configuration. In the first configuration of the plunger 102, the spacing 308 between the second split ring 210 and the bottom plate 206 is not equal to zero and the second split ring 210 and the bottom plate 206 do not touch each other, except at the second inner tapered surface 514 of the second split ring 210 and the second tapered surface 510 of the bottom plate 206. In the first configuration, the shoulder bolts 504 rest in a first position on respective seats 516 in the respective shoulder bolt cavities 304 of the top plate 204. The shoulder bolts 504 pass through aligned holes 518 in the first split ring 208 and the second split ring 210. The remaining shoulder bolts 504 (not shown) rest on their respective seats 516 of the shoulder bolt cavities 304 (not shown in FIG. 5) of the top plate 204 in their respective first positions. Further, in the first configuration, a separation 520 exists between the top plate 204 and the first split ring 208. The bottom plate 206 is not yet in contact with the molding material 212 (not shown in FIG. 5). In one aspect of this disclosure, a periphery of the top plate 204 and a periphery of the bottom plate 206 are each defined by a diameter $D_1$. The diameter $D_1$ may define an overall periphery of the plunger 102. A first outer surface 522 of the first split ring 208 and a second outer surface 524 of the second split ring 210 are aligned with the overall periphery of the plunger 102. By way of example only and not by way of limitation, $D_1$=12.188 in. Further, in the first configuration, the first split ring 208 and the second split ring 210 are each in a relaxed natural state.

FIG. 6 illustrates a closer view of a portion of the plunger 102 in relation to the pot 104, the plunger 102 being in the first configuration, in accordance with an aspect of this disclosure. In this first configuration, as the plunger 102 begins to move down into the pot 104, the gap 202 is maintained between the plunger 102 and the inner wall 224 of the pot 104. The spring member 402', as well as the spring member 402" (not shown in FIG. 6), are extended and push the bottom plate 206 downwards towards the base 216 of the pot 104. As a result, the first split ring 208 and the second split ring 210 are in a relaxed state. The first outer surface 522 of the first split ring 208 and the second outer surface 524 of the second split ring 210 are still aligned with the periphery of the plunger 102 such that the overall diameter $D_1$ of the plunger 102 is maintained in the first configuration. In the first configuration of the plunger 102, the bottom plate 206 does not yet touch the molding material 212. In one aspect of this disclosure, the molding material 212 may be placed inside the volume 232 of the pot 104 prior to a start of a molding cycle of the molding system 100.

Referring to FIG. 7, a second configuration of the plunger 102 along the cross-section A-A of FIG. 4 is illustrated, in accordance with an aspect of this disclosure. In the second configuration, the molding material 212 (not shown in FIG. 7), pushes against a bottom surface of the bottom plate 206. The bottom plate 206 moves in a direction of the Y-axis to close the spacing 308. Each one of the pair of spring members 402' and 402" is now in a compressed state having a length $L_2$, $L_2 < L_1$. As a result of the compression of the pair of spring members 402' and 402", the shoulder bolts 504 are unseated from the seats 516, respectively. The shoulder bolts 504 are now in a second position in which each of the shoulder bolts 504 has moved up by a height 702. In one aspect, the height 702 is equal to a sum of the heights of the spacing 308 and the separation 520 along the Y-axis.

In the second configuration, due to the bottom plate 206 pushing against the top plate 204, the first split ring 208 and the second split ring 210 move laterally and radially outwards in a direction of arrows 704 and 706 parallel to or in the X-Z plane. Such movement of the first split ring 208 and the second split ring 210 causes the gap 202 between the inner wall 224 of the pot 104 and the plunger 102 to close. The movement of the first split ring 208 and the second split ring 210 occurs along the first tapered surface 508 and the second tapered surface 510, respectively. In the second configuration, due to the movement of the first split ring 208 and the second split ring 210 outwards to move closer to and/or touch the inner wall 224, the overall diameter of the plunger 102 increases to $D_2$. In one aspect of this disclosure, if 't' is a thickness of the gap 202, then $D_2=D_1+t$. By way of example only, the first split ring 208 and the second split ring 210 may move by 0.060 in such that the diameter $D_2$=12.248 in (assuming the original diameter $D_1$=12.188 in).

FIG. 8 illustrates a closer view of a portion of the plunger 102 in relation to the pot 104, the plunger 102 being in the second configuration, in accordance with an aspect of this disclosure. In the second configuration, the bottom plate 206 comes in contact with and is pushed up along the Y-axis by the molding material 212. Due to this motion of the bottom plate 206, the second split ring 210 and the first split ring 208 are pushed outward. The presence of the split 306 in the first split ring 208 and correspondingly, the second split 1002 (discussed with respect to FIG. 10) in the second split ring 210 allows the first split ring 208 and the second split ring 210 to move closer to or contact the inner wall 224 of the pot 104. The first inner tapered surface 512 of the first split ring 208 moves along the first tapered surface 508 of the top plate 204 to attain the second configuration, as illustrated in FIGS. 7-8. Likewise, the second inner tapered surface 514 of the second split ring 210 moves along the second tapered surface 510 of the bottom plate 206 to attain the second configuration. As a result, the gap 202 is reduced or closed such that the molding material 212 flows into the plurality of sprues 120 to the mold cavity 222. Each of the plurality of sprues 120 may have a tapered orifice through which the molding material 212 travels down into the mold cavity 222 for processing, although other shapes of the plurality of sprues 120 (e.g., cylindrical) could be used. In one aspect of the disclosure, in the second configuration, the top plate 204 is in direct contact with the bottom plate 206 of the plunger 102. In this second configuration, the pair of spring members 402' and 402" are each compressed, and the spacing 308 vanishes since the top plate 204 is in direct contact with the bottom plate 206 of the plunger 102.

Figure 9:
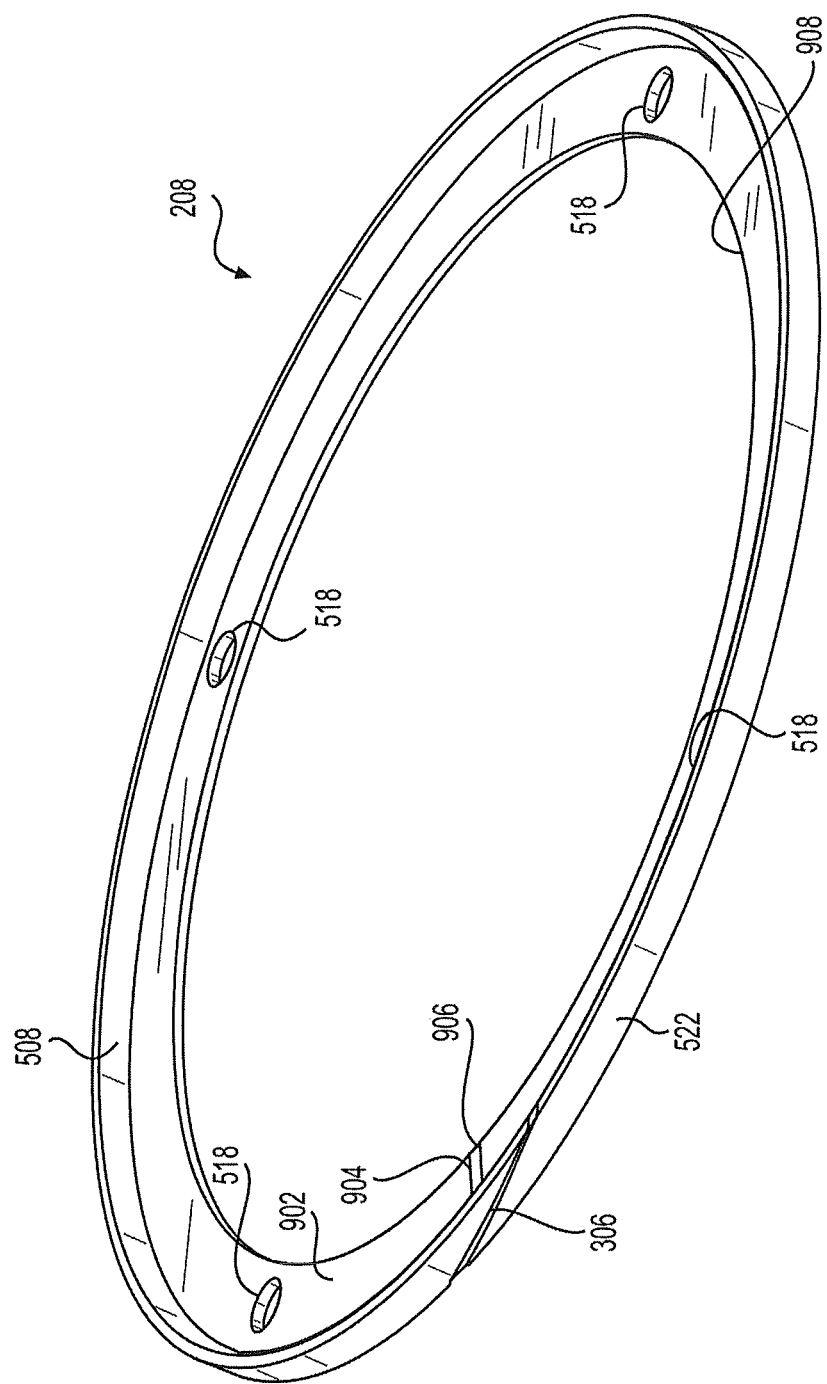
FIG. 9 illustrates a first split ring of the plunger, in accordance with an aspect of this disclosure.
Figure 11:
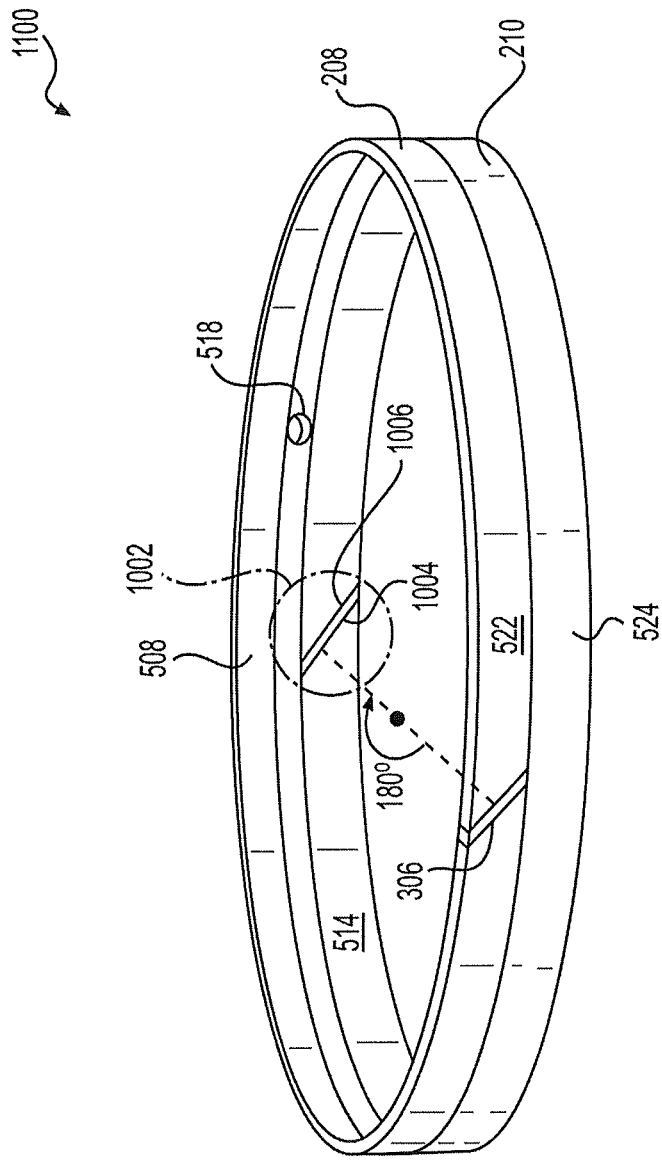
FIG. 11 illustrates a dual split ring arrangement of the plunger, in accordance with an aspect of this disclosure.

FIG. 9 illustrates an exemplary structure and shape of the first split ring 208, in accordance with an aspect of this disclosure. In FIG. 9, the first split ring 208 is illustrated in a relaxed state, for example, in the first configuration. In this relaxed state, the first split 306 is not open and ends 904 and 906 of the first split 306 touch each other with maximum overlap. In one aspect, the ends 904 and 906 are configured to slide against each other, and based upon a size of the gap 202, to eventually separate to have the first split ring 208 attain the second configuration in which the first outer surface 522 touches the inner wall 224 of the pot 104 (not shown in FIG. 9). FIG. 9 illustrates the first inner tapered surface 512 and one of each of the aligned holes 518 through which the shoulder bolts 504 pass, respectively. The first split ring 208 is in contact with the second split ring 210 at a first bottom surface 908 of the first split ring 208, as illustrated in FIG. 11. By way of example only, the first split ring 208 may be metallic.

Figure 10:
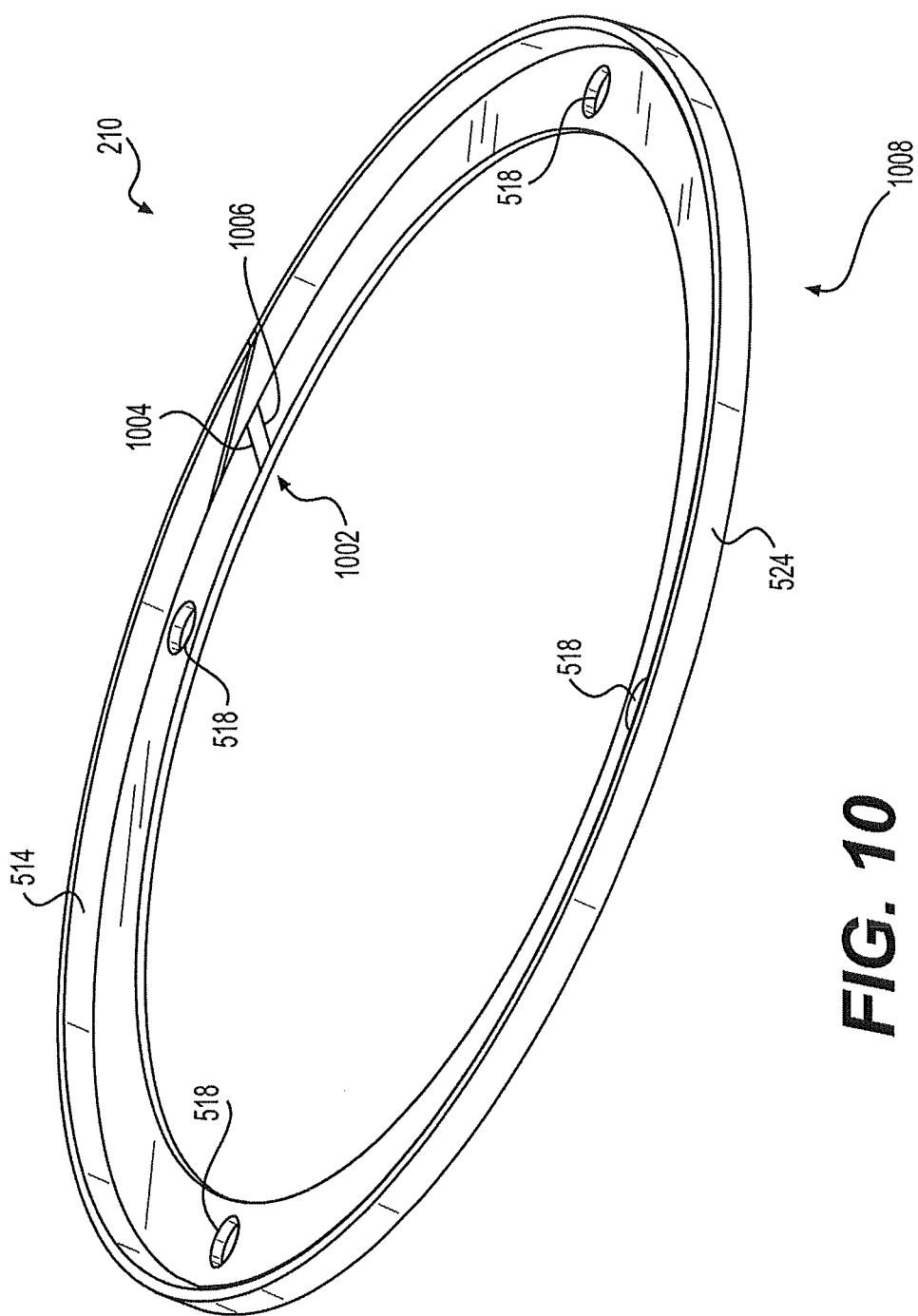
FIG. 10 illustrates a second split ring of the plunger, in accordance with an aspect of this disclosure.

FIG. 10 illustrates the second split ring 210, in accordance with an aspect of this disclosure. The second split ring 210 is substantially identical to the first split ring 208, except that the second split 1002 is provided 180° apart from the first split 306. In FIG. 10, the second split ring 210 is illustrated in a relaxed state, for example, in the first configuration. In this relaxed state, the second split 1002 is not open and ends 1004 and 1006 of the second split 1002 touch each other with maximum overlap. In one aspect, the ends 1004 and 1006 are configured to slide against each other and, based upon the size of the gap 202, to eventually separate to have the second split ring 210 attain the second configuration in which the second outer surface 524 touches the inner wall 224 of the pot 104 (not shown in FIG. 10). FIG. 10 illustrates the second inner tapered surface 514 and one of each of the aligned holes 518 through which the shoulder bolts 504 pass, respectively. The second split ring 210 is in contact with the first split ring 208 at a second bottom surface 1008 that touches the first bottom surface 908 of the first split ring 208 as illustrated in FIG. 11. By way of example only, the second split ring 210 may be metallic.

FIG. 11 illustrates the first split ring 208 and the second split ring 210 joined together to form the dual split ring arrangement 1100 (shown in a standalone view), in accordance with an aspect of this disclosure. The first split 306 and the second split 1002 are oriented diametrically opposite to each other, although in other aspects of this disclosure, other relative orientations of the first split 306 and the second split 1002 may be used. For example, instead of 180°, the first split 306 and the second split 1002 may be at substantially 180°, at 179°, etc. The aligned holes 518 are arranged such that the shoulder bolts 504 may pass through to keep the first split ring 208 and second split ring 210 together.

INDUSTRIAL APPLICABILITY

Various aspects of the present disclosure are applicable generally to molding systems having a plunger and a pot arrangement. More particularly, various aspects of the present disclosure are applicable to the molding system 100 and a method 1200 including a dual split ring plunger. Conventionally, during a molding process, resin or molding material is placed into a pot and a plunger pushes the molding material through sprues and into a mold cavity. The clearance or gap between an edge of the plunger and an inside edge or an inner wall of the pot has to be as close as possible without having the edge of the plunger touch the pot side. The number of sprues and the cross section of the sprues (or, a calculated area of all the sprues) will dictate the dimensions of the minimum gap between the pot and the plunger. If the gap has a larger cross section than the calculated sprue area, then the molding material will take the path of least resistance and push up between the pot and plunger instead of flowing into the part cavity. This will create a scrap part or flash. If the gap has a smaller cross section than the calculated sprue area, an operator of the mold press will have to pry the mold plates apart creating a potential unsafe condition.

According to an aspect of this disclosure, an exemplary solution is to use the dual split ring plunger 1100 formed by the first split ring 208 and the second split ring 210 that is spring operated by the pair of spring members 402' and 402" to allow a larger size of the gap 202 between the pot 104 and the plunger 102 when the mold plate 148 is open. For example, a size of the gap 202 may be six times a size of the gaps available in the conventional molding systems. The transfer pressure collapses the plurality of spring members 402' and 402" (or, in alternative aspects, overcomes the repulsive forces of the pair of magnets) and the first split ring 208 and the second split ring 210 are expanded by corresponding first tapered surface 508, the second tapered surface 510, the first inner tapered surface 512 and the second inner tapered surface 514 in the first split ring 208 and the second split ring 210 and the plunger 102, respectively. The expansion of the first split ring 208 together with the second split ring 210 may increase the diameter $D_1$ of the plunger 102 to the diameter $D_2$ to create the minimum size of the gap 202 necessary for the molding material 212 to always travel into the mold cavity 222. When the mold is opened the plurality of spring members 402' and 402" will push the top plate 204 and the bottom plate 206 and the first split ring 208 and the second split ring 210 apart and increase a size of the gap 202 between the pot 104 and the plunger 102. The larger size of the gap 202 will allow the mold to open via gravity and without the assistance of a pry bar and will eliminate the unsafe condition.

Figure 12:
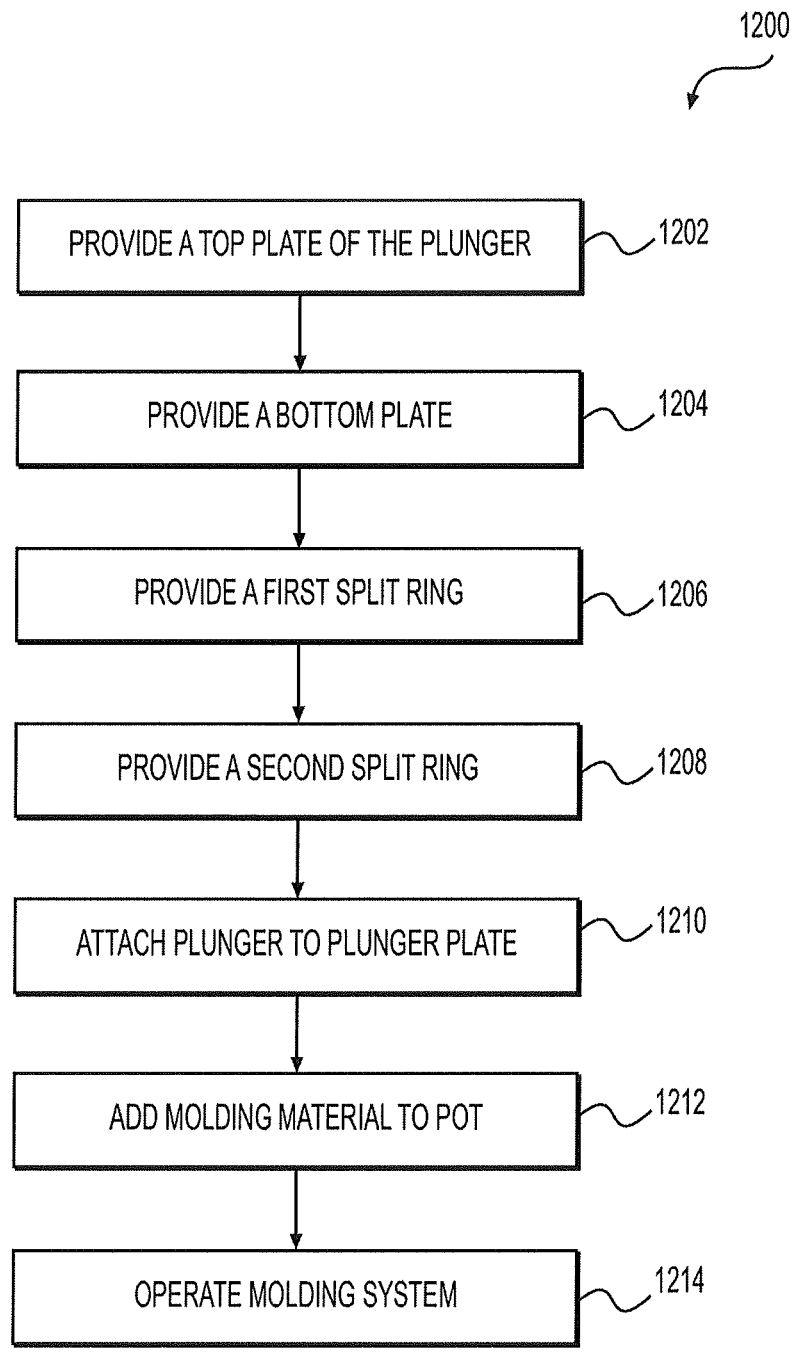
FIG. 12 illustrates a method of making the plunger, in accordance with an aspect of this disclosure.

Referring to FIG. 12, the method 1200 of making the plunger 102 is illustrated in accordance with an aspect of this disclosure. It is to be noted that the discussion herein applies to all the plungers 102 on the plunger plate 101 and the plunger 102 is being described by way of example only and not by way of limitation. FIG. 12 presents the method 1200 as a flow chart, although the method 1200 may be understood using other types of presentations such as process diagrams, graphs, etc. In one aspect, one or more processes or operations in the method 1200 may be carried out by an operator (e.g., a robotic operator or a human). The operator may be present near the molding system 100 or may be present in a remote location, e.g., in a laboratory outside the location of the molding system 100. In another aspect, in the method 1200, one or more processes or operations, or sub-processes thereof, may be skipped or combined as a single process or operation, and the flow of processes or operations in the method 1200 may be in any order not limited by the specific order illustrated in FIG. 12. For example, one or more processes or operations may be moved around in terms of their respective orders, or may be carried out in parallel.

In an operation 1202, the top plate 204 of the plunger 102 is provided. The top plate 204 may include one or more of the cutouts 506' and 506" to accommodate the pair of spring members 402' and 402". In one aspect, instead of or in addition to the pair of spring members 402' and 402", pairs of magnets may be provided.

In an operation 1204, the bottom plate 206 of the plunger 102 may be provided, in accordance with an aspect of this disclosure. The bottom plate 206 may be aligned with the top plate 204. For example, the central set screw hole 302 and/or the set screw 502 may be used to carry out such an alignment and hold the top plate 204 and the bottom plate 206 in a predetermined arrangement. In one aspect, the pair of spring members 402' and 402" may be inserted between the bottom plate 206 and the top plate 204 prior to the attachment of the bottom plate 206 to the top plate 204.

In an operation 1206, the first split ring 208 may be provided, in accordance with an aspect of this disclosure. The first split ring 208 may contact the first tapered surface 508 of the top plate 204 of the plunger 102 at the first inner tapered surface 512. The first split ring 208 may be provided coupled to the top plate 204 in an initially relaxed state.

In an operation 1208, the second split ring 210 may be provided, in accordance with an aspect of this disclosure. The second split ring 210 may be held to the first split ring 208 by the shoulder bolts 504 passing through the aligned holes 518. Similar to the first split ring 208, the second split ring 210 may be provided in an initially relaxed state coupled to the first split ring 208, as illustrated, e.g., in FIG. 11.

In an operation 1210, the plunger 102 may be attached to the plunger plate 101 of the molding system 100. For example, the screws 180 may by inserted into the receptacles 380 of the top plate 204 of the plunger 102 to attach the plunger 102 to the plunger plate 101.

In an operation 1212, the molding material 212 (e.g., rubber) may be added to the base 216 of the pot 104. Initially, when the first split ring 208 and the second split ring 210 are in a relaxed state, the molding material 212 is not in contact with a bottom surface of the bottom plate 206.

In an operation 1214, the molding system 100 may be operated by bringing the plunger plate 101, and the plunger 102 downwards towards the mold plate 148 to contact the molding material 212. Upon contact, the bottom plate 206 pushes against the pair of spring members 402' and 402" to compress the pair of spring members 402' and 402". This causes the first split ring 208 and the second split ring 210 to expand outward and move closer to or even touch the inner wall 224 of the pot 104. As a result, the molding material 212 does not flow upward into the gap 202 and only flows through the plurality of sprues 120.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

We claim:

1. A plunger comprising:
   a top plate;
   a bottom plate coupled to the top plate;
   a first split ring between the top plate and the bottom plate and coupled to the top plate; and
   a second split ring between the first split ring and the bottom plate and coupled to the first split ring.

2. The plunger of claim 1, wherein the first split ring and the second split ring are in a first configuration when the bottom plate of the plunger is not in contact with a molding material, and wherein the first split ring and the second split ring are in a second configuration when the bottom plate of the plunger is in contact with the molding material.

3. The plunger of claim 2, wherein in the first configuration, the first split ring and the second split ring are together aligned with a periphery of the top plate and a periphery of the bottom plate, and wherein in the second configuration, the first split ring and the second split ring are together outside the periphery of the top plate and the periphery of the bottom plate to close a gap between the plunger and an inner wall of a pot into which the molding material is poured.

4. The plunger of claim 3, wherein the second configuration is maintained as the plunger moves to push the molding material into a mold cavity via a plurality of sprues, said gap remaining closed by the first split ring and the second split ring while the second configuration is maintained.

5. The plunger of claim 2, wherein the top plate includes a first tapered surface along which the first split ring is arranged to move from the first configuration to the second configuration, and the bottom plate includes a second tapered surface along which the second split ring is arranged to move from the first configuration to the second configuration simultaneously with the first split ring.

6. The plunger of claim 2, wherein the top plate is separated from the bottom plate in the first configuration by a spring member between the top plate and the bottom plate, and wherein the top plate is in contact with the bottom plate in the second configuration when the spring member is compressed.

7. The plunger of claim 1, wherein the top plate and the bottom plate are separated by a spring member, the spring member configured to be in an extended state when the plunger is not in contact with a molding material and in a compressed state when the plunger is in contact with the molding material.

8. The plunger of claim 1 further comprising:
   a plurality of shoulder bolts configured to hold the top plate and the bottom plate together.

9. The plunger of claim 8, wherein the plurality of shoulder bolts are configured to move from a first position in which the top plate is separated from the bottom plate by a spring member to a second position when the top plate is in direct contact with the bottom plate, the spring member being compressed in the second position.

10. The plunger of claim 1, wherein the first split ring includes a first inner tapered surface configured to contact the top plate correspondingly at a first tapered surface, and wherein the second split ring includes a second inner tapered surface configured to contact the bottom plate correspondingly at a second tapered surface.

11. The plunger of claim 1, wherein the first split ring includes a first split that is oriented 180° relative to a second split of the second split ring.

12. A molding system, comprising:
    a pot configured to hold a molding material; and
    a plunger configured to move along an inner wall of the pot to push the molding material into a mold cavity through a plurality of sprues at a base of the pot, said plunger including:
       a top plate,
       a bottom plate coupled to the top plate by a pair of spring members,
       a first split ring between the top plate and the bottom plate and coupled to the top plate, and
       a second split ring between the first split ring and the bottom plate and coupled to the first split ring.

13. The molding system of claim 12, wherein a gap exists between the plunger and the inner wall of the pot, when the plunger is not in contact with the molding material.

14. The molding system of claim 12, wherein the first split ring and the second split ring move to close a gap between the plunger and the inner wall of the pot when the bottom plate of the plunger contacts the molding material, said molding material flowing into the mold cavity via the plurality of sprues with the gap remaining closed.

15. The molding system of claim 14, wherein the top plate includes a first tapered surface along which the first split ring is arranged to move with the second split ring to close the gap, and the bottom plate includes a second tapered surface along which the second split ring is arranged to move with the first split ring to close the gap.

16. The molding system of claim 12, wherein the molding system is one of a transfer molding system or a compression molding system.

17. The molding system of claim 12, wherein the pair of spring members are configured to be in an initial relaxed state when the plunger is not in contact with the molding material and in a compressed state when the plunger is in contact with the molding material.

18. The molding system of claim 12, wherein the first split ring and the second split ring form a dual split ring arrangement, the first split ring includes a first inner tapered surface configured to contact the top plate correspondingly at a first tapered surface, and wherein the second split ring includes a second inner tapered surface configured to contact the bottom plate correspondingly at a second tapered surface.

19. The molding system of claim 12, wherein the plunger includes a plurality of shoulder bolts configured to hold the top plate and the bottom plate together.

\* \* \* \* \*